UNITED STATES PATENT OFFICE.

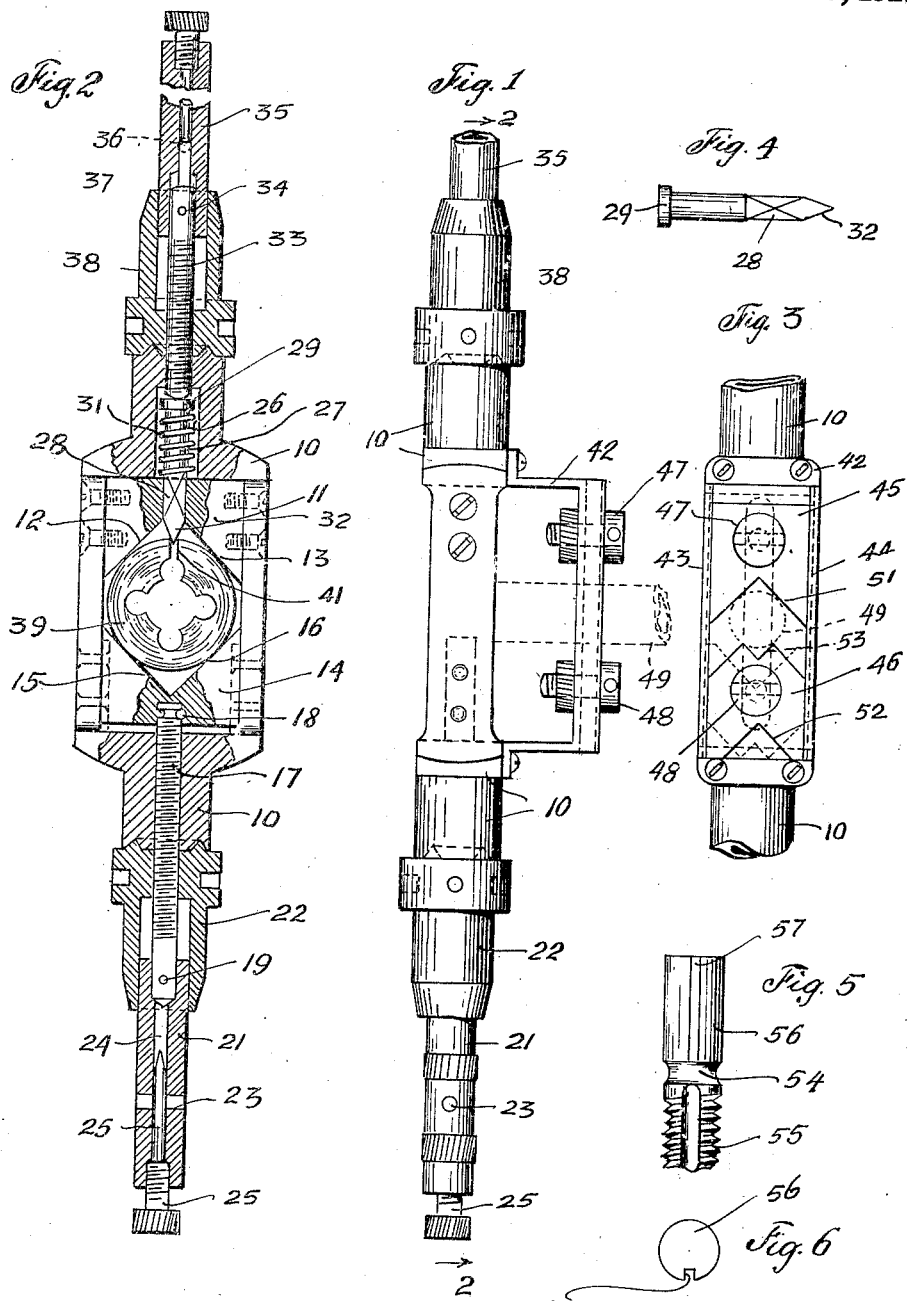

GEORGE PEKLAR, OF CICERO, ILLINOIS.

SCREW-THREADING TOOL.

1,368,651.  Specification of Letters Patent.  Patented Feb. 15, 1921.

Application filed July 17, 1919. Serial No. 311,541.

*To all whom it may concern:*

Be it known that I, GEORGE PEKLAR, a citizen of the Republic of Austria, residing at Cicero, in the county of Cook and State of Illinois, have invented certain new and useful Improvements in Screw-Threading Tools, of which the following is a specification.

My invention relates to screw threading tools and has for its primary object the provision of an improved screw threading die and stock therefor by means of which the internal diameter of the cutting die may be adjusted within small limits to vary the diameter of the thread cut on a pipe, bolt or shaft. A further object lies in the provision of an improved form of tap and die stock constructed and arranged to facilitate the adjustment of the parts to cut threads of varying diameters. A further object is to provide an improved stock readily adaptable to hold dies or taps and an improved form of tap for use therewith.

Other objects and advantages of this invention will appear from the following description, taken in conjunction with the accompanying drawings which form a part of this specification and illustrate the preferred embodiment of the invention.

In the drawings:

Figure 1 is a side elevation of the stock of the present invention.

Fig. 2 is a view partly in section looking in the direction of the arrows 2—2 of Fig. 1 and partly in front elevation, illustrating an adjustable one-piece thread cutting die positioned in the stock jaws.

Fig. 3 is a fragmentary rear elevation of the stock of the invention.

Fig. 4 is a side elevation of a wedge bar forming a part of this invention.

Fig. 5 is a side elevation of one end of an improved form of tap comprising a part of the invention.

Fig. 6 is a top view of the tap shown in Fig. 5.

Reference numeral 10 indicates the stock of the present invention. This defines a rectangular hollow space in the upper end of which is fixed a jaw 11 having the inner tool receiving surfaces 12 and 13 set at right angles to each other and each at an angle of 45 degrees as regards the longitudinal axis of the stock. In the lower or opposite end of the stock a similar jaw 14 having similarly disposed surfaces 15 and 16, is slidably mounted for movement toward and from jaw 11. Threaded into the lower end of the stock is a feed screw 17 swiveled by a pin connection 18 to the slidable jaw 14 and secured by means of a pin 19 to an operating handle 21. A lock nut 22 is threaded on the feed screw for locking jaw 14 in any given position. Preferably the operating handle 21 is transversely apertured as at 23 for insertion of a lever. In the particular embodiment shown the handle 21 is also axially bored as at 24 to receive a screw driver 25. A wedge chamber 26 is formed in the upper end of stock 10 and holds a wedge 27, the lower squared end 28 of which slides in an aperture provided in the fixed jaw 11. A head 29 is formed on the upper end of wedge 27, and a spring 31 is coiled about the wedge in recess 26 and has its ends bearing respectively against the head 29 and the upper surface of the fixed jaw 11. Obviously spring 31 tends to withdraw the wedge shaped lower end 32 of wedge 27 from the angle formed between surfaces 12 and 13 of jaw 11. A wedge adjusting bolt 33 is threaded in the upper end of the stock 10 and, by mean of a pin 34, is secured to an upper operating handle 35. Handle 35 is preferably cross-apertured as at 36 for the insertion of a lever and is also radially bored to receive for purposes of transportation a lever 37. A lock nut 38 is threaded upon the wedge adjusting screw 33 to lock the same in any given position; the lower or inner end of screw 33 contacting with the outer or upper end of wedge 27 to hold the wedge rigidly in any desired position.

The jaws 11 and 14 are adapted to receive a thread cutting die 39 which at one point in its periphery is split as at 41. There is, of course, a normal diameter of thread which die 39 will cut on a pipe, bolt, shaft or the like. It will be recognized that for the purpose of causing a screw threaded joint to become tight for a few turns of the thread, it will be necessary to slightly enlarge the diameter mentioned and conversely, it will be necessary to slightly reduce that diameter in case it is desired to have the threaded interfitting parts become tightly joined after a large number of turns. To accomplish these slight increases or decreases in the diameter of threads cut by die 39 I have devised the combination of the present invention. Fig. 2 may be considered as illustrating the die fixed within the jaws for the cutting of a thread of normal diameter. If it be desired to cut a thread of slightly greater diameter (the difference however being extremely small) feed screw 17 is rotated to slightly lower jaw 14 as viewed in Fig. 2 and, by rotation of the wedge screw 33, the wedge is driven into the split 41 of the die thereby forcing the sides of the die outwardly in opposite directions against the surfaces 12 and 13 of jaw 11. Conversely, when it is desired to slightly decrease from normal the diameter of the thread to be cut, the wedge is slightly withdrawn upwardly, (as viewed in Fig. 2,) from split 41 and jaw 14 is advanced toward the fixed jaw 11 thereby slightly lessening the width of split 41, compressing the die 39 between the jaws and very slightly reducing it from its normal diameter.

At 42 in Figs. 1 and 3 is shown a guide bracket rigidly carried by the stock 10 and spaced therefrom. Upon the guide bracket are formed a pair of parallel guide flanges 43 and 44 in which are mounted opposed guide blocks 45 and 46 respectively. By means of suitable bolts 47 and 48 the guide blocks 45 and 46 are centered with respect to the pipe 49 to be threaded and with respect to the die 39. Obviously such a change in diameter in die 39 as has been above described, will cause a slight alteration of the exact axis of the die. The guide blocks 45 and 46 (being adjustable vertically in the guide bracket,) may be shifted very slightly for each change in diameter of the die 39 so that the guide blocks accurately center the present device upon the article 49 being threaded. To accommodate the guide blocks to various sizes of tubing or shafting the upper block 45 is preferably formed into one large V shaped jaw while the opposite block 46 is reversible in the guide bracket and is formed with a somewhat smaller V shaped jaw 52 and a very much smaller V shaped jaw 53. The reversed position of guide block 46 is indicated in dotted lines in the lower portion of Fig. 3.

Figs. 5 and 6 illustrate a tap 54 provided with nut tapping threads 55 and having its head 56 longitudinally channeled as at 57 to receive the wedge shaped end 32 of wedge 27. The stock of the present invention is thus seen to be useful in holding either a thread cutting die or a nut tapping tool, the head 56 of the latter tool being bound between jaws 11 and 14 of the stock and the tool itself being held against rotation with respect to the jaws by insertion of the wedge in the channel 57.

In the operation of the invention, the die 39 is positioned in the stock and adjusted to the desired diameter as herein above described, and the guide blocks 45 and 46 are adjusted concentrically with the die. The tool is now set upon the article 49 to be threaded and the thread cutting process carried on in the well known manner by rotation of the stock about the axis of the article 49. In a similar manner the tapping tool 54 is positioned in the stock, and employed for tapping nuts, nipples and other well known articles.

While I have illustrated and described the preferred embodiment of the invention, it will be obvious that one skilled in the art may make modifications thereof without departing from the spirit of the invention. I wish therefore not to be restricted to the precise embodiment shown, except in so far as the same is limited in the appended claims.

I claim:

1. The combination with a suitable stock, of a fixed jaw in one end thereof, an opposed jaw mounted in the opposite end of the stock for movement toward and from said fixed jaw, a split die mounted between said jaws and a wedge slidably mounted in said fixed jaw and adjustable toward and from said movable jaw.

2. The combination with a suitable stock, of relatively movable opposed jaws mounted therein, a split die held by said jaws, and a wedge centrally and slidably positioned in one of said jaws and adjustable toward and from the opposite jaw to vary the diameter of said die.

3. The combination of a stock having a jaw receiving recess, a fixed jaw mounted in one end thereof, a wedge slidably mounted in said fixed jaw, a spring normally tending to withdraw the wedge from the angle defined by the fixed jaw, a wedge adjusting screw thread in the stock and bearing against the outer end of said wedge, a jaw mounted in the opposite end of the stock for movement toward and from the fixed jaw, a die between said jaws, and a jaw operating screw thread in said opposite end of the stock and having a swiveled connection with said movable jaw.

4. The combination with a suitable stock, of relatively movable die holding jaws mounted therein, a screw cutting die split at one point only and mounted within said jaws, a wedge mounted in the stock, normally positioned in the split of the die, and adjustable toward and from the die, a guide bracket spacedly carried by the stock, and a pair of opposed guide blocks mounted in the bracket and adjustable to position them concentrically with respect to the die held in the stock.

5. The combination with a stock for thread cutting tools, of opposite alined screws threaded in the respective ends of said stock, an operating handle fixed upon the outer end of each screw, a lock nut mounted on each screw for rotation against the stock to hold the screw in each instance in rigid relation to the stock, and an outwardly extending reënforcing tubular projection formed upon each lock nut and telescopically receiving the operating handle of its respective screw.

In testimony whereof I have affixed my signature.

GEORGE PEKLAR.